United States Patent [19]

Matsuzono et al.

[11] Patent Number: 5,274,520
[45] Date of Patent: Dec. 28, 1993

[54] THIN FILM MAGNETIC HEAD

[75] Inventors: Atsushi Matsuzono; Teiichi Miyauchi, both of Kanagawa, Japan

[73] Assignee: Sony Corporation, Tokyo, Japan

[21] Appl. No.: 758,758

[22] Filed: Sep. 12, 1991

[30] Foreign Application Priority Data

Sep. 12, 1990 [JP] Japan .................. 2-242028

[51] Int. Cl.$^5$ .......................... G11B 5/127
[52] U.S. Cl. ................................ 360/113
[58] Field of Search .............. 360/113; 324/252; 338/32 R

[56] References Cited

U.S. PATENT DOCUMENTS 3,975,772 8/1976 Lin ........................... 360/113

FOREIGN PATENT DOCUMENTS 0269129 6/1988 European Pat. Off.
0300559 1/1989 European Pat. Off.
WO88/03307 5/1988 PCT Int'l Appl.
2175735 12/1986 United Kingdom.

Primary Examiner—Craig E. Church
Attorney, Agent, or Firm—Hill, Steadman & Simpson

[57] ABSTRACT

A thin film magnetic head comprises a thin film magnetic core provided with a magnetic head gap, forming part of a first closed magnetic path and extended substantially in parallel to an air bearing surface to be disposed opposite to the surface of a magnetic recording medium, a head coil magnetically coupled with the first closed magnetic path, and a magnetoresistance-effect element forming a second closed magnetic path magnetically coupled with a portion of the first closed magnetic path including the magnetic head gap. The thin film magnetic head is provided with auxiliary magnetic head gaps respectively in portions of the first closed magnetic path other than the portion including the magnetic head gap. The portions of the first closed magnetic path provided with the auxiliary magnetic head gaps have comparatively high magnetic resistances, so that the distribution of magnetic flux to the magnetoresistance-effect element can be regulated to improve the reproducing efficiency of the magnetoresistance-effect element.

4 Claims, 12 Drawing Sheets

11: Connecting hole

Distance along the runng direction of the magnetic recording medium between the magnetization inversion boundary of the magnetic recording medium and the magnetic head gap Distance along the running direction of the magnetic recording medium between the magnetization inversion boundary of the magnetic recording medium and the magnetic head gap FIG. II
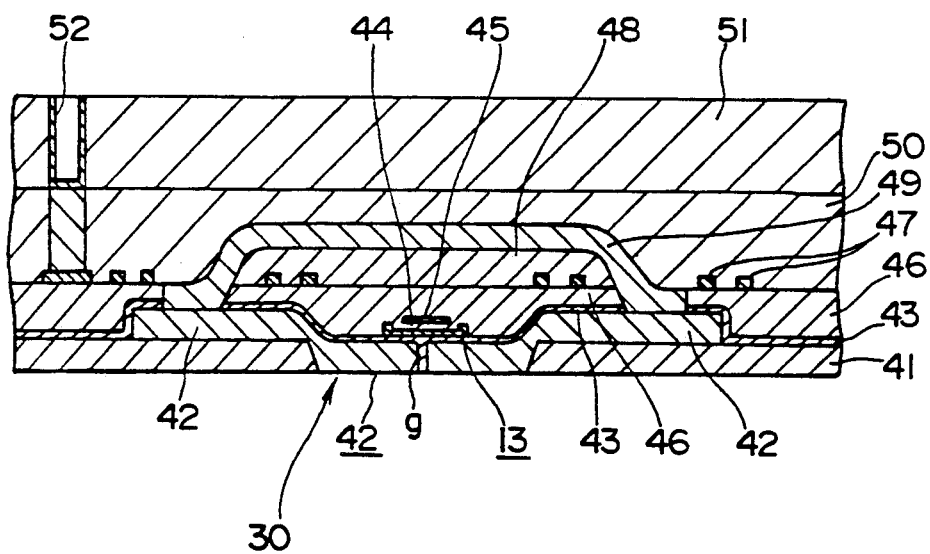

THIN FILM MAGNETIC HEAD

BACKGROUND OF THE INVENTION

1. Field of the Invention

The present invention relates to a thin film magnetic head and, more particularly, to a horizontal thin film magnetic head of a composite construction comprising a magnetoresistance-effect magnetic head (hereinafter referred to as "MR magnetic head") employing a magnetoresistance-effect element (hereinafter referred to as "MR element") and an inductive recording head.

2. Description of the Prior Art

A horizontal thin film magnetic head has become an object of attention owing to its advantages in dealing with narrow tracks with the recent progressive increase in magnetic recording density. On the other hand, many studies of MR magnetic head employing a MR element advantageous in respect of reproducing sensitivity have been made, and a horizontal MR thin film magnetic head comprising, in combination, a horizontal thin film magnetic head and a MR magnetic head has been proposed.

Such a horizontal MR thin film magnetic head is proposed, for example, in Japanese Patent Laid-open (Kokai) No. Sho 62-134814 for the applicant of the present patent application. As shown in a schematic enlarged sectional view in FIG. 9, this previously proposed horizontal MR thin film magnetic head has a MR magnetic head having a magnetic circuit forming a closed magnetic path, comprising a pair of magnetic cores 38A and 38B disposed opposite to each other with a magnetic head gap g formed between the opposite ends thereof facing a magnetic recording medium, a magnetoresistance-effect element (hereinafter referred to as "MR element") 13 having opposite ends magnetically connected to the magnetic cores 38A and 38B, and a bias conductor layer 16 surrounded by the magnetic cores 38A and 38B and the MR element 13 and embedded in an insulating layer 8. The bias conductor layer 16 is extended perpendicularly to the longitudinal direction of the MR element 13. Portions of the pair of magnetic cores 38A and 38B, and the surface of a protective layer 39 form an air bearing surface 30.

As shown in a schematic enlarged sectional view in FIG. 10, the MR element 13 has a two-layer construction comprising a 300 Å thick MR thin film $MR_A$ formed of NiFe, a 300 Å thick MR thin film $MR_B$, and a nonmagnetic layer 35 formed of $Al_2O_3$, having a thickness that allows the magnetostatic coupling of the MR thin films $MR_A$ and $MR_B$ and does not allow the mutual interaction of the MR thin films $MR_A$ and $MR_B$, for example, 60 Å, and sandwiched between the MR thin films $MR_A$ and $MR_B$. The axes of easy direction of magnetization of the MR thin films $MR_A$ and $MR_B$ are extended along the width of the MR thin films $MR_A$ and $MR_B$. When sense currents $I_s$ are supplied to the MR thin films $MR_A$ and $MR_B$ along the axes of difficult direction of magnetization, the growth of magnetic domain walls is suppressed and Barkhausen noise can be reduced.

When the closed magnetic path is thus formed by providing the MR element 13 in the magnetic path provided with the magnetic head gap g, the length of the magnetic path between the magnetic head gap g and the MR element 13 is small, which improves the reproducing efficiency. Furthermore, the horizontal construction enables providing a high output voltage and a large S/N ratio. Since the MR element 13 is spaced apart a sufficiently large distance from the air bearing surface 30, the horizontal MR thin film magnetic head can be processed stably and has stable reliability. However, the construction of a recording head is not taken into construction in designing the horizontal MR thin film magnetic head.

The applicant of the present patent application proposed previously a thin film magnetic head in Japanese Patent Application No. Hei 1-253673. As shown in FIG. 11, this previously proposed thin film magnetic head has a front core 42 provided with a magnetic head gap g and extended in parallel to an air bearing surface 30, a MR element 13 of a laminate construction consisting of magnetostatically coupled MR thin films and a nonmagnetic film sandwiched between the MR thin films, formed so as to extend across the magnetic head gap g on the front core 42, a bias conductor layer 45 formed over the MR element 13 to apply a bias magnetic field to the same, an insulating layer 46 enclosing the MR element 13 and the bias conductor layer 45, a head coil 47 formed on the insulating layer 46, an insulating layer 48 covering the head coil 47, and a back core 42 extending over part of the head coil 47 and having opposite ends joined respectively to the opposite ends of the front core 42.

Although the MR element 13 is disposed near the magnetic head gap g, in some cases, the back core 49 affect adversely to the reproducing efficiency.

SUMMARY OF THE INVENTION

Accordingly, it is an object of the present invention to provide a thin film magnetic head of a composite type having a MR reproducing head and an inductive recording head, and capable of reproducing recorded information at a high reproducing efficiency and of satisfactorily operating for both recording information and reproducing recorded information.

In a first aspect of the present invention, a thin film magnetic head comprises a thin film magnetic core provided with a magnetic head gap, forming part of a first closed magnetic path and extended substantially in parallel to an air bearing surface to be disposed opposite to the surface of a magnetic recording medium, a head coil magnetically coupled with the first closed magnetic path, and a MR element forming a second closed magnetic path magnetically coupled with a portion of the first closed magnetic path including the magnetic head gap. The thin film magnetic head is provided with auxiliary magnetic head gaps respectively in portions of the first closed magnetic path other than the portion including the magnetic head gap.

In a second aspect of the present invention, a thin film magnetic head comprises a thin film magnetic core provided with a magnetic head gap, forming a closed magnetic path and extended substantially in parallel to an air bearing surface to be disposed opposite to the surface of a magnetic recording medium, a head coil magnetically coupled with the closed magnetic path, and a MR element. The MR element is provided in an auxiliary magnetic head gap formed in the closed magnetic path.

In the thin film magnetic head in the first aspect of the present invention, the MR element 13 is disposed in the comparatively small second magnetic path, and the first closed magnetic path is provided with the auxiliary magnetic head gaps. Therefore, the portions of the first closed magnetic path provided with the auxiliary magnetic head gaps have comparatively high magnetic resistances, so that the distribution of magnetic flux to the MR element can be regulated to improve the reproducing efficiency of the MR element.

In the thin film magnetic head in the second aspect of the present invention, only the single closed magnetic path is formed and the MR element is disposed in the closed magnetic path, which improves reproducing efficiency. Since the head coil is magnetically coupled with the closed magnetic path and a bias magnetic field is applied to the MR element by the head coil, the thin film magnetic head need not be provided with any biasing conductor, which simplifies the process of fabricating the thin film magnetic head.

BRIEF DESCRIPTION OF THE DRAWINGS

The above and other objects, features and advantages of the present invention will become more apparent from the following description taken in connection with the accompanying drawings, in which:

FIG. 11 is an enlarged schematic sectional view of another conventional thin film magnetic head.

DESCRIPTION OF THE PREFERRED EMBODIMENT

Prior to the description of the preferred embodiments of the present invention, the effect of the present invention will be explained.

Figure 3:
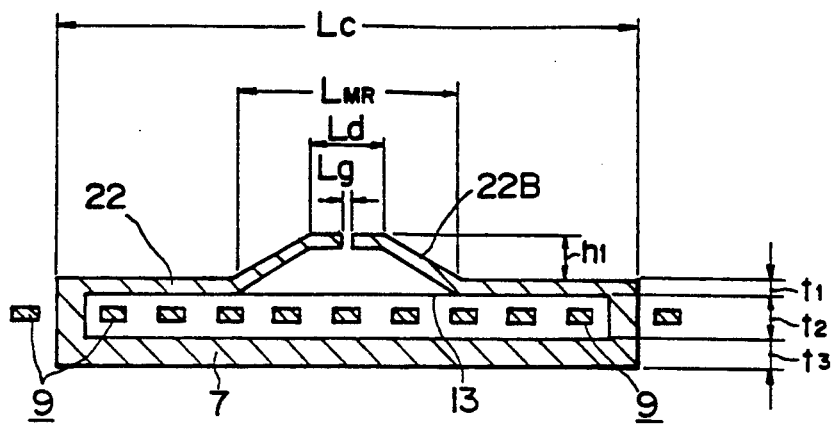
FIG. 3 is an enlarged schematic sectional view of an analytical model.

The effect of the present invention was confirmed by calculating the reproducing efficiency of the MR element on the basis of data obtained through simulation using a two-dimensional analytical model shown in FIG. 3. In the two-dimensional analytical model, a front thin film magnetic core 22 has a magnetic head gap having a gap length Lg of 0.5 $\mu$m, a portion of the front thin film magnetic core forming part of an air bearing surface to be disposed opposite to the surface of a magnetic recording medium has a length Ld of 5.0 $\mu$m, a MR element 13 has a length $L_{MR}$ of 15 $\mu$m, the front thin film magnetic core 22 and a back thin film magnetic core 7 have a length Lc, namely, a length along the direction of the gap length, of 40 $\mu$m, the front thin film magnetic core has a thickness $t_1$ of 1.0 $\mu$m, connecting portions interconnecting the front thin film magnetic core 22 and the back thin film magnetic core 7 have a thickness $t_2$ of 2.0 $\mu$m, the back thin film magnetic core has a thickness $t_3$ of 2.0 $\mu$m, and the sloping portions of the front thin film magnetic core 22 has a height $h_1$ of 2.9 $\mu$m.

The simulation was performed by an integration method to determine isolated pulse response characteristics and the intensity of a magnetic field created by the thin film magnetic head on an assumption that the thin film magnetic cores 22 and 7 have an initial magnetic permeability $\mu_i$ of 1000 and a saturation magnetic flux density $B_s$ of 8000 G, and the magnetic recording medium employs a permanently magnetized magnet element and has a remanent magnetic flux density $B_r$ of 10000 G and a 0.045 $\mu$m thick magnetic layer. The results of the simulation are shown in FIG. 4.

Figure 4:
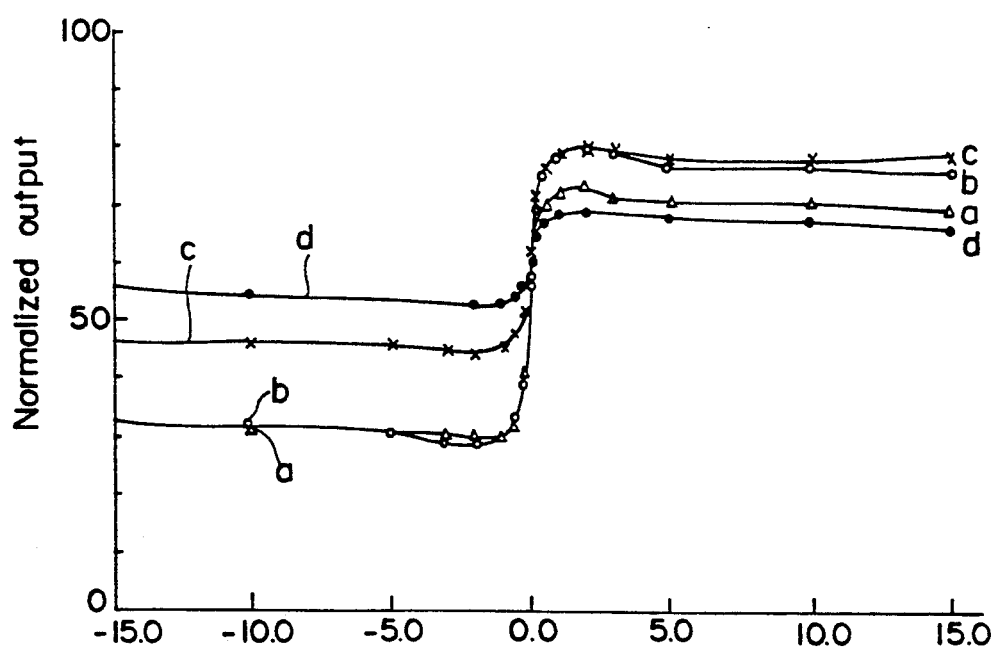
FIG. 4 is a graph showing the reproducing output characteristics of thin film magnetic heads.

In FIG. 4, curves a and b are for thin film magnetic heads of different constructions in accordance with the first aspect of the present invention, a curve c is for a thin film magnetic head in accordance with the second aspect of the present invention, and a curve d is for a thin film magnetic head in a comparative example formed by omitting the auxiliary magnetic head gaps of a thin film magnetic head in accordance with the present invention.

As is obvious from the curves a and b, the peak-to-peak values of the output of the thin film magnetic heads in the first aspect of the present invention are as high as 49.7% and 42.8%, respectively. As indicated by the curve c, the peak-to-peak value of the output of the thin film magnetic head in the second aspect of the present invention is 35.4%, which is more than twice the peak-to-peak value of 16% of the output of the comparative example indicated by the curve d. Thus, the simulation proved that the present invention improves reproducing efficiency.

Figure 5:
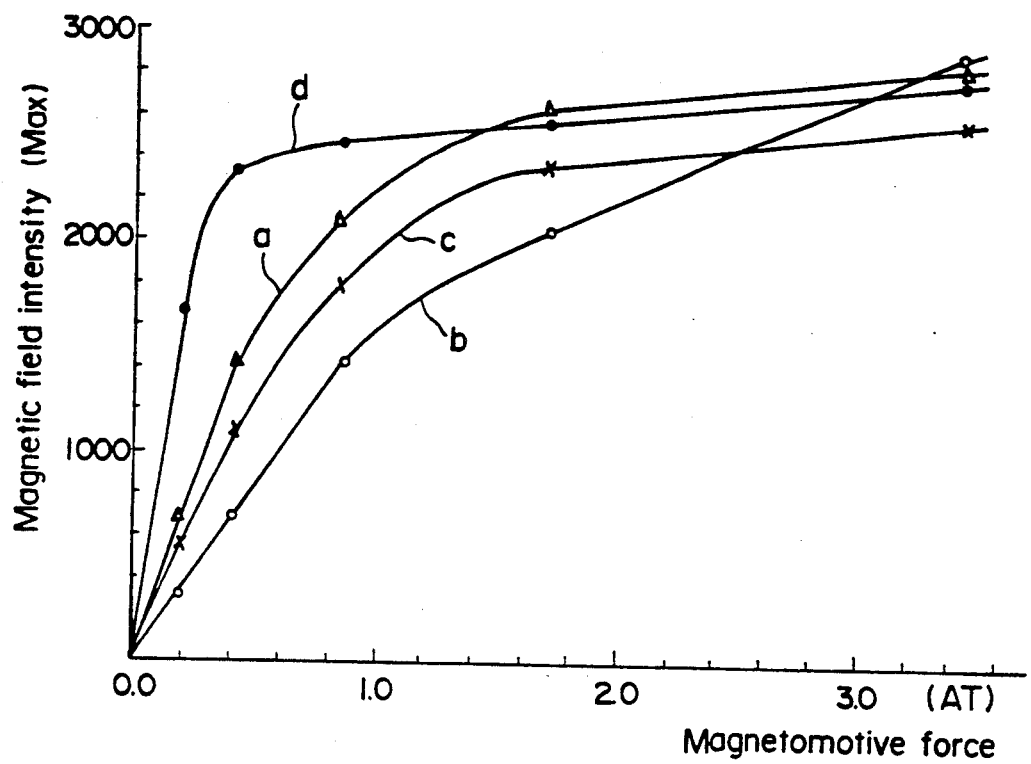
FIG. 5 is a graph showing the magnetic field creating characteristics of thin film magnetic heads.

The variation of magnetic field intensity at a position 1.5 $\mu$m above the air bearing surface 30 with current was determined through simulation. The results of simulation are shown in FIG. 5. As indicated by a curve d in FIG. 5, the magnetic field creating efficiency of the comparative example is the highest. The intensity of a magnetic field created by the thin film magnetic head in the first aspect of the present invention is approximately equal to that of a magnetic field created by the comparative example when the current is about 1 AT.

Examples of thin film magnetic heads in the first and second aspects of the present invention will be described hereinafter.

EXAMPLE 1

Figure 6A:
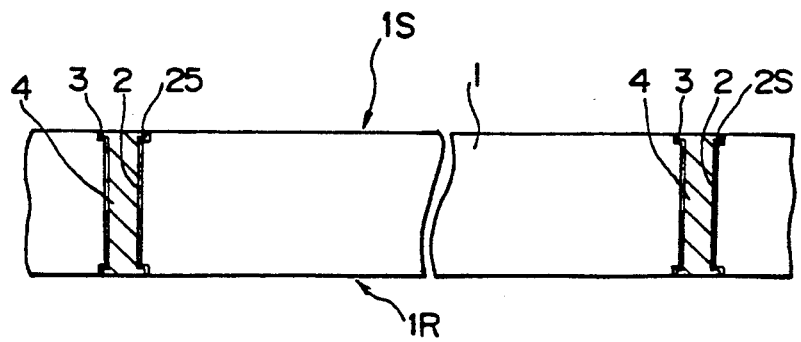
FIGS. 6A to 6K are sectional views of assistance in explaining a process of fabricating a thin film magnetic head in accordance with the present invention.

As shown in FIG. 6A, An insulating substrate 1 is formed of $Al_2O_3 \cdot TiC$, $CaTiO_3$, a ferrite ceramic or crystallized glass. Terminal holes 2 are formed in the insulating substrate 1 by laser drilling. Steps 2S are formed at the opposite ends of the terminal holes 2 by using HCl or the like. Metal layers 3 of a metal, such as Co, are formed over the entire upper major surface 1S and the entire lower major surface 1R of the insulating substrate 1 by a sputtering process or the like, and then the metal layers 3 are coated with a metal, such as Ni, by electroplating. Then, the coated major surfaces 1S and 1R are ground to expose the major surfaces 1S and 1R of the insulating substrate 1 so that only the surfaces of the terminal holes 2 are coated with the metal layer 3.

Figure 6B:
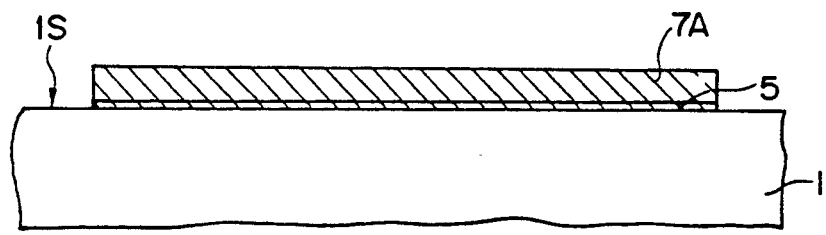

As shown in FIG. 6B, a magnetic layer 5 of a magnetic material, such as NiFe, is formed by sputtering or the like as a base layer over the entire major surface 1S, a magnetic layer 7A of NiFe or the like is formed in a predetermined pattern by an ordinary frame plating process or the like, and then the magnetic layer 5 is patterned in the pattern of the magnetic layer 7A by, for example, a wet etching process.

Figure 6C:
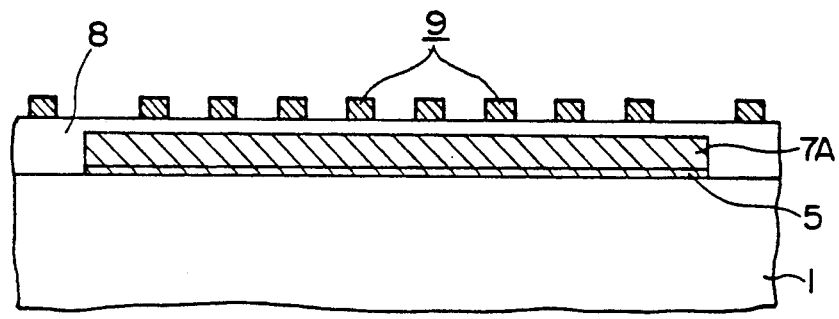

As shown in FIG. 6C, a nonmagnetic insulating layer 8, such as a $SiO_2$ layer, is formed over the entire major surface 1S so as to cover the magnetic layers 5 and 7A, the surface of the insulating layer 8 is ground flat, a conductive layer, such as a Cu layer, is formed over the insulating layer 8, a photoresist is formed on the conductive layer by a photolithographic process, and then the conductive layer is subjected to an anisotropic etching process, such as an ion trimming process, to form a head coil 9.

Figure 6D:
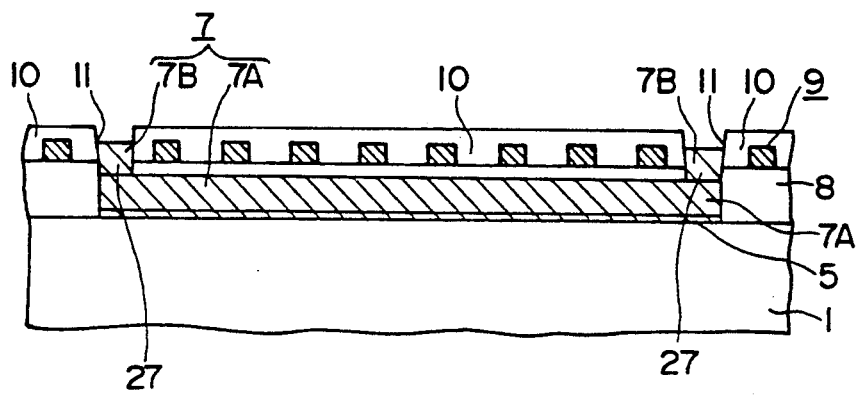

Then, as shown in FIG. 6D, an insulating layer 10 of $SiO_2$ is formed so as to coat the head coil 9, connecting holes 11 reaching the periphery of the magnetic layer 7A are formed through the insulating layer 10 by a reactive ion etching process using a mask formed by photolithography. The connecting holes 11 are filled about half full with NiFe or the like by plating to form bent portions 27 of a back thin film magnetic core 7. The back thin film magnetic core 7 consists of the magnetic layer 7A and a magnetic layer 7B forming the bent portions 27.

Figure 6E:
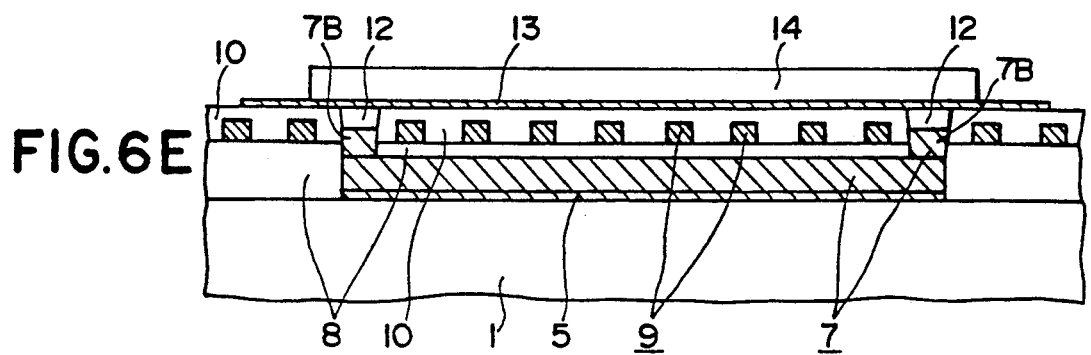

Then, as shown in FIG. 6E, an insulating layer 12 of $SiO_2$ or the like is formed over the magnetic layer 7B so as to fill up the connecting holes 11, the surface of the insulating layer 12 is ground flat, and then a MR element 13 is formed on the insulating layer 12.

Figure 10:
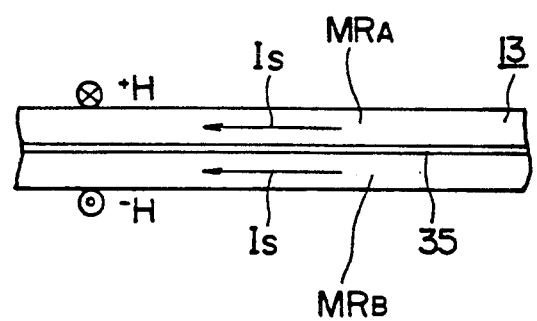
FIG. 10 is an enlarged schematic sectional view of a MR element.

The MR element 13, similarly to the conventional MR element shown in FIG. 10, consists of a 300 Å thick magnetic layer $MR_A$ of NiFe, a 300 Å thick magnetic layer $MR_B$ of NiFe, and a nonmagnetic intermediate layer 35 of $Al_2O_3$ having a thickness of about 60 Å and sandwiched between the magnetic layers $MR_A$ and $MR_B$. The magnetic layers $MR_A$ and $MR_B$ have easy direction of magnetization parallel to the track width. The magnetic layers $MR_A$ and $MR_B$ can magnetostatically coupled and scarcely interact mutually.

Then, an insulating layer 14 of $SiO_2$ or the like is formed over the entire surface of the MR element 13 by a sputtering process, and then the insulating layer 14 is patterned so that the periphery of the MR element 13 is exposed.

Figure 6F:
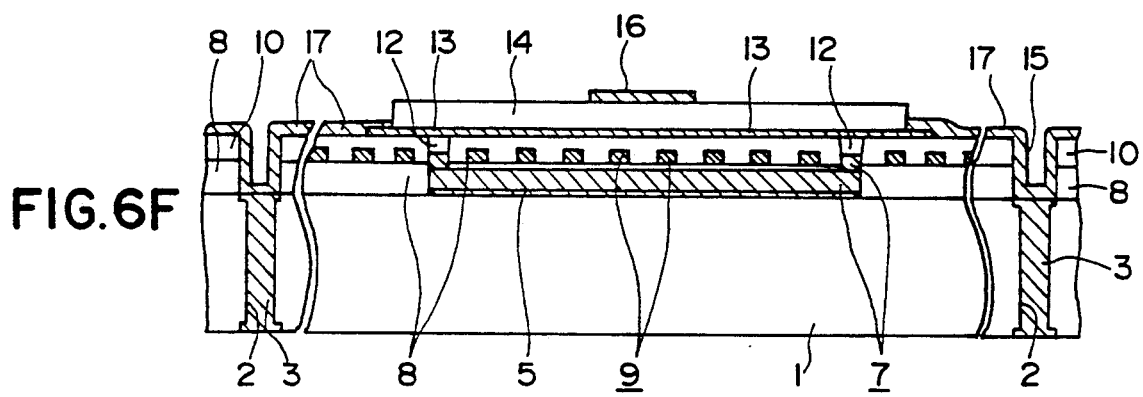

Then, as shown in FIG. 6F, through holes 15 are formed through the insulating layers 8 and 10 to the surface of an electrode layer 4 formed on the substrate 1. A conductive layer of Cu is formed over the entire insulating layer 14 by sputtering, and then the conductive layer is patterned in a desired pattern to form a bias conductor layer 16 extending perpendicularly to the paper. A predetermined current $I_B$ is supplied to the bias conductor layer 16 so as to flow perpendicularly to the longitudinal direction of the MR element 13. Electrodes 17 for the MR element 13 are formed through the through holes 15 so as to be connected to the electrode layer 4 in the terminal holes 2 by patterning the conductive layer. A sense current $I_S$ is supplied to the MR element 13 through the electrodes 17 so as to flow in the longitudinal direction of the MR element 13.

Figure 6G:
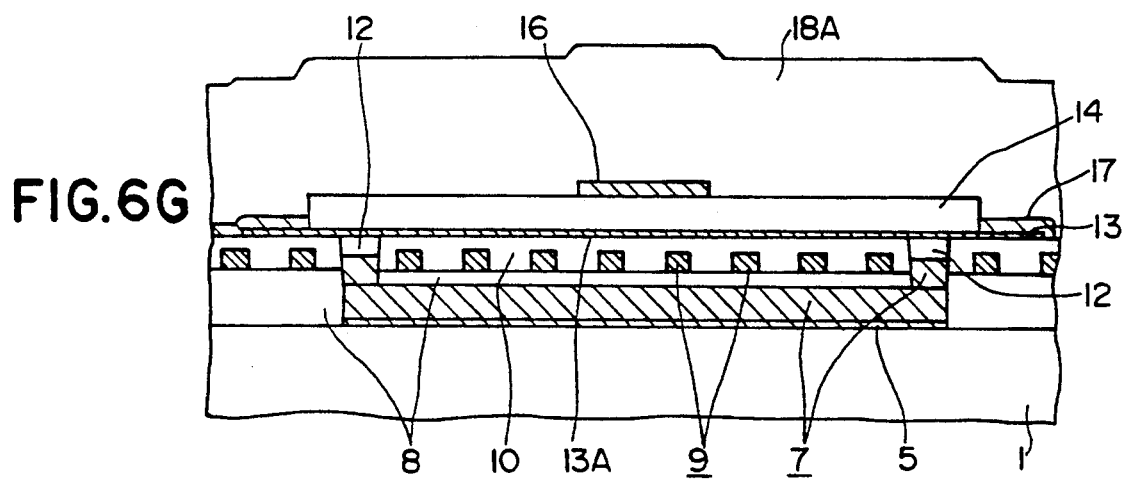

As shown in FIG. 6G, A thick insulating layer 18A of $SiO_2$ having a thickness on the order of several micrometers is formed so as to cover the bias conductor layer 16 and the electrodes 17 entirely.

Figure 6H:
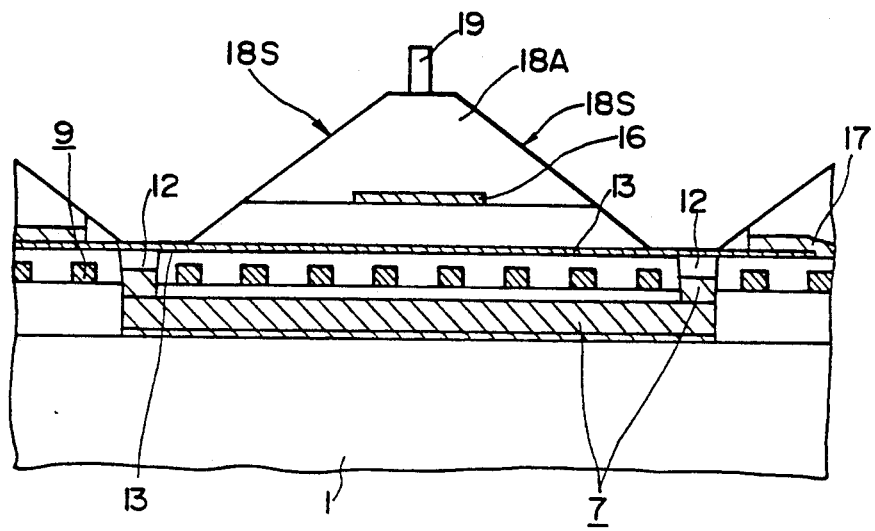

Then, as shown in FIG. 6H, the thick insulating layer 18A is subjected to an anisotropic etching process, such as a reactive ion etching process, to form a ridge having a narrow flat top formed above the bias conductor layer 16, and slopes 18S of a predetermined inclination, and then a narrow three-layer resist 19 is formed on the flat top of the ridge.

Figure 6I:
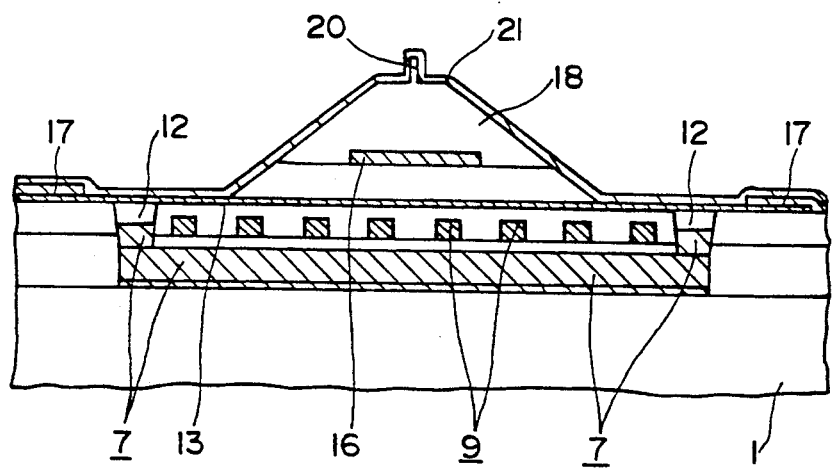

Then, as shown in FIG. 6I, an tapered insulating layer 18 having a gap section 20 is formed over the bias conductor layer 16, and then the insulating layer 18A, except a portion thereof extending over the bias conductor layer 16, is removed by a reactive ion etching process. Then, a magnetic layer 21, i.e, a base layer, is formed over the entire surface of the work by sputtering or the like.

Figure 6J:
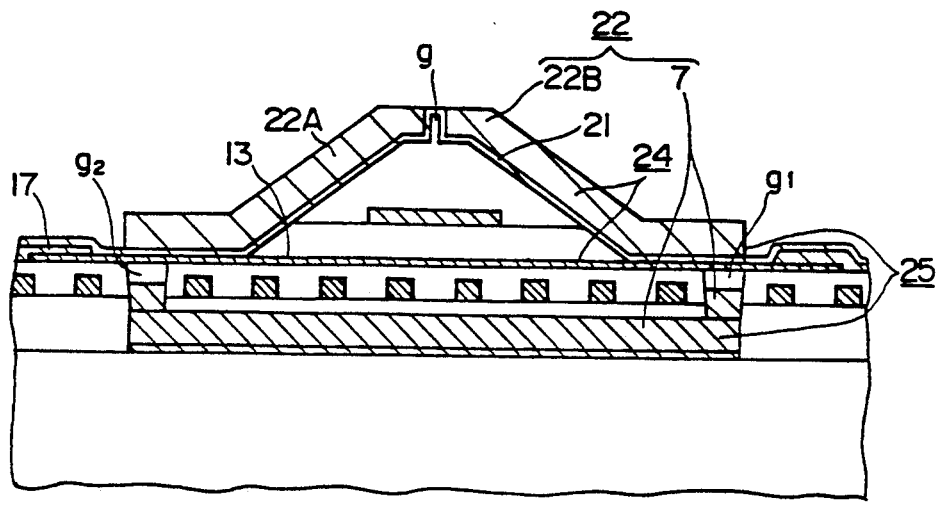

Then, as shown in FIG. 6J, a front thin film magnetic core 22 of NiFe is formed in a predetermined pattern by, for example, a frame plating process. Auxiliary gaps $g_1$ and $g_2$ filled up with the insulating layer 12 are formed between the front thin film magnetic core 22 and the back thin film magnetic core 7.

Figure 6K:
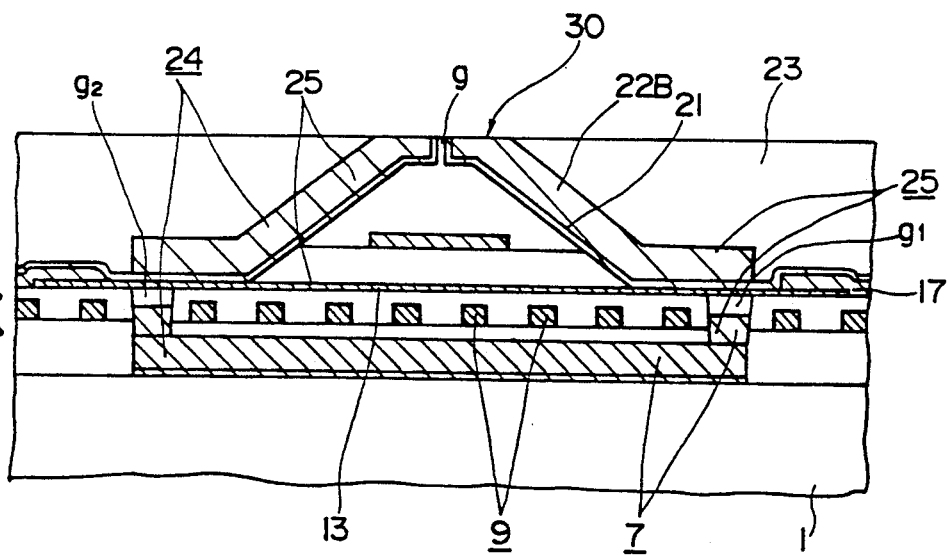

Then, as shown in FIG. 6K, an insulating layer 23 of $SiO_2$ or the like is formed over the entire surface of the work so as to cover the front thin film magnetic core 22 entirely, and then the insulating layer 2, the front thin film magnetic core 22, the magnetic layer 21 and the insulating layer are ground in a flat mirror surface serving as an air bearing surface 30 including the surface of the gap section 20 to complete the thin film magnetic head.

As shown in FIG. 6K, in the thin film magnetic head thus fabricated, the front thin film magnetic core 22 and the back thin film magnetic core 7 form a first closed magnetic path including a magnetic head gap g, the MR element 13 is disposed so that a second closed magnetic path 25 is coupled magnetically with a portion of the first closed magnetic path 24 including the magnetic head gap g, and the auxiliary magnetic head gaps $g_1$ and $g_2$ are formed in other portions of the MR element 13. The thin film magnetic head operates at a high reproducing efficiency of 42.8% as indicated by the curve a in FIG. 4.

EXAMPLE 2

Figure 7A:
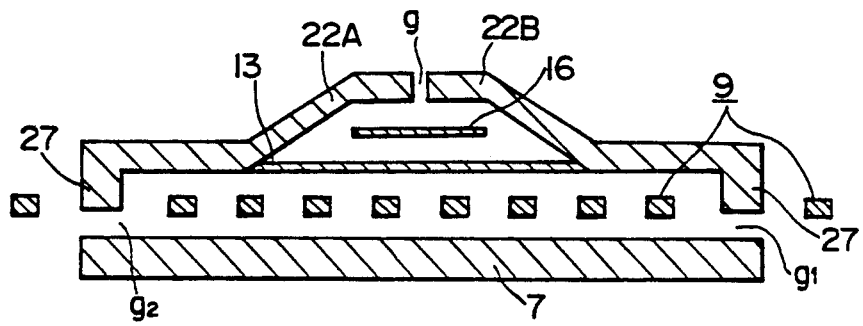
FIGS. 7A to 7G are enlarged schematic sectional views of examples of thin film magnetic heads in accordance with the present invention.

The back thin film magnetic core 7 of Example 1 is provided with the bent portions 27 extending toward the front thin film magnetic core 22. A thin film magnetic head in Example 2 has a front thin film magnetic core 22 provided with bent portions 27 and auxiliary magnetic head gaps $g_1$ and $g_2$ are formed between the bent portions 27 and a back thin film magnetic core 7 as shown in FIG. 7A.

The thin film magnetic head in Example 2 operated at a high reproducing efficiency.

EXAMPLE 3

Figure 7B:
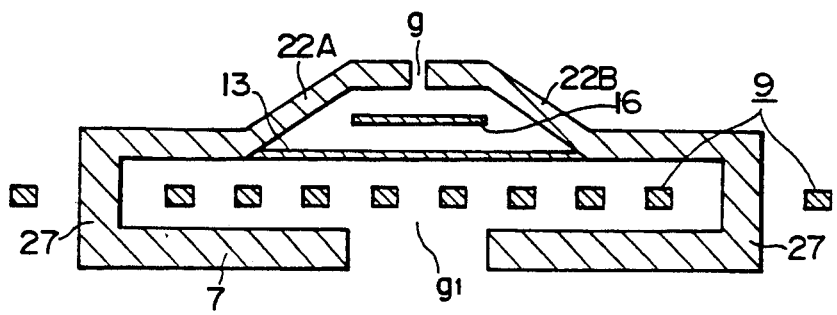

A thin film magnetic head in Example 3 has a back thin film magnetic core 7 provided in its middle portion with an auxiliary magnetic head gap $g_1$ as shown in FIG. 7B.

The thin film magnetic head in Example 3 operated at a high reproducing efficiency.

EXAMPLE 4

Figure 7C:
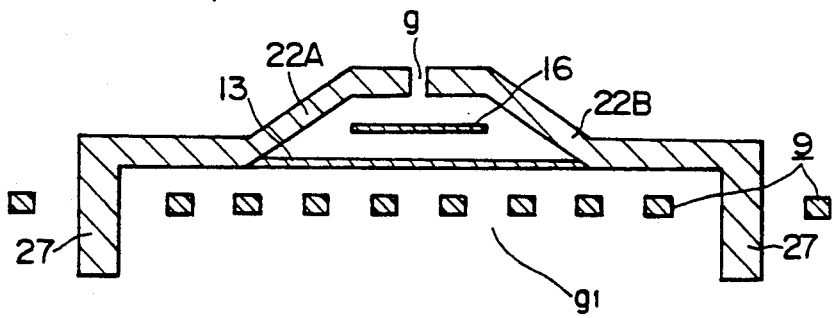

A thin film magnetic head in Example 4 has only a front thin film magnetic core 22 provided with bent portions 27 forming an auxiliary magnetic head gap $g_1$ therebetween as shown i FIG. 7C.

This thin film magnetic head was found to have characteristics represented by the curves b in FIGS. 4 and 5, and operated at a high reproducing efficiency.

EXAMPLE 5

Figure 7D:
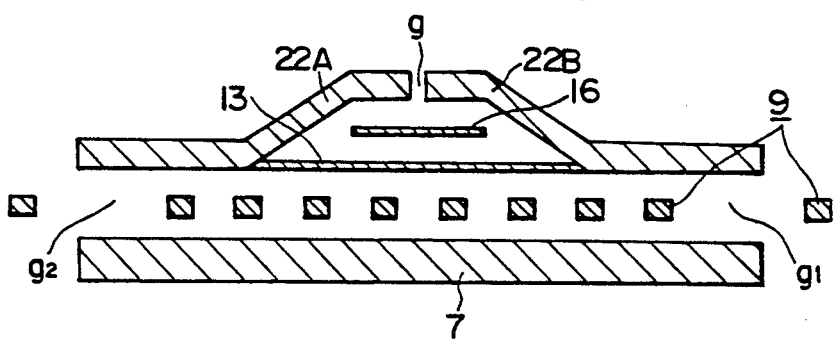
Figure 7E:
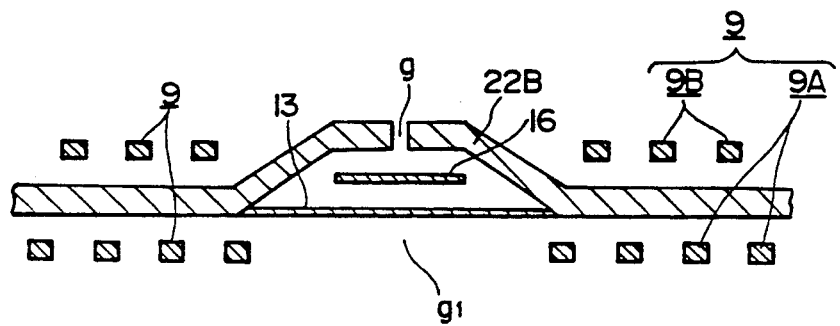

A thin film magnetic head in Example 5 has a front thin film magnetic core 22 and a back thin film magnetic core 7 forming an auxiliary magnetic head gap $g_1$ therebetween as shown in FIG. 7D. This thin film magnetic head operated at a high reproducing efficiency substantially equal to that of the thin film magnetic head in Example 1.

EXAMPLE 6

A thin film magnetic head in Example 6 does not have any back thin film magnetic core, has only a front thin film magnetic core 22 having opposite ends extended outward in a plane to form an auxiliary magnetic head gap $g_1$ between its opposite ends substantially in magnetically parallel to a closed magnetic path including a MR element 13, and a three-dimensional head coil 9 formed by patterning conductive layers 9A and 9B formed respectively over the upper and lower surfaces of the front thin film magnetic core 22.

This thin film magnetic head is capable of effectively creating a recording magnetic fields without using any back magnetic thin film core. Not being provided with any back thin film magnetic core, the thin film magnetic head is able to operate at a reproducing efficiency equal to or higher than that of the thin film magnetic head in Example 4 shown in FIG. 7C.

EXAMPLE 7

Figure 7F:
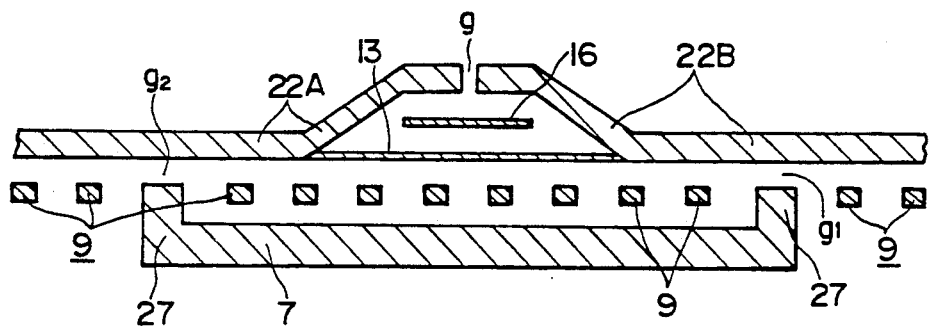

A thin film magnetic head in Example 7 has a back thin film magnetic core 7, and a front thin film magnetic core 22 extending beyond a position corresponding to the opposite ends of the back thin film magnetic core 7 as shown in FIG. 7F. Auxiliary magnetic head gaps $g_1$ and $g_2$ are formed between the back thin film magnetic core 7 and the front thin film magnetic core 22 at positions corresponding to the opposite ends of the back thin film magnetic core 7.

Since the front thin film magnetic core 22 extends beyond the positions corresponding to the opposite ends of the back thin film magnetic core 7, the demagnetizing action of magnetic fields created in the vicinity of the auxiliary magnetic head gaps $g_1$ and $g_2$ on the magnetic recording medium can be avoided. The thin film magnetic head is able to operate at an improved reproducing efficiency.

In the foregoing thin film magnetic heads in Examples 2 to 6, the extension of the front thin film magnetic core 22 gives the thin film magnetic heads an effect of avoiding demagnetizing action.

EXAMPLE 8

In the foregoing thin film magnetic heads, the MR element 13 is coupled magnetically through the bias conductor layer 16 with part of the front thin film magnetic core 22 to form the second closed magnetic path 25. The present invention is applicable to a thin film magnetic head having, similarly to the conventional thin film magnetic head shown in FIG. 11, a MR element 13 near a magnetic head gap g.

Figure 7G:
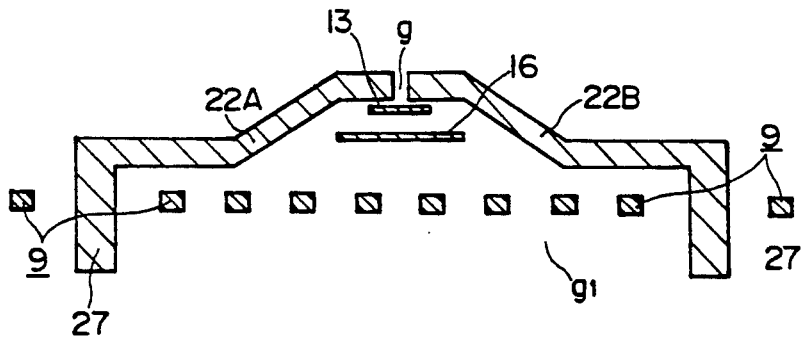
Figure 9:
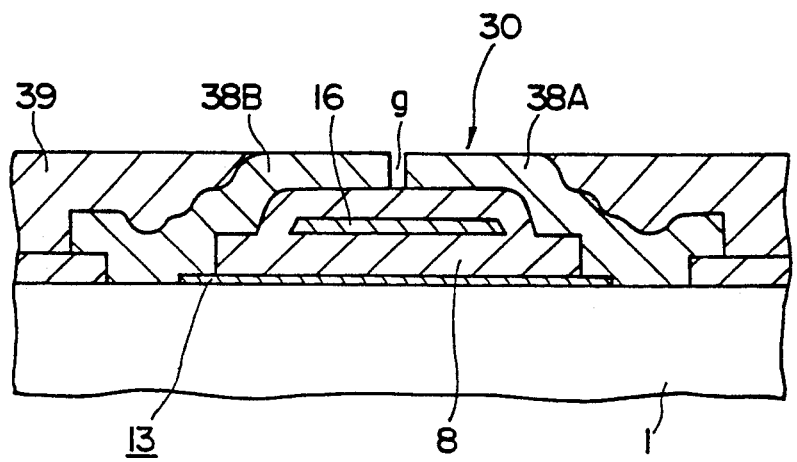
FIG. 9 is an enlarged schematic sectional view of a conventional thin film magnetic head.

As shown in FIG. 7G, a thin film magnetic head in Example 8 has a front thin film magnetic core 22 provided with bent portions 27 respectively at its opposite ends and is not provided with any back thin film magnetic core.

Figure 8:
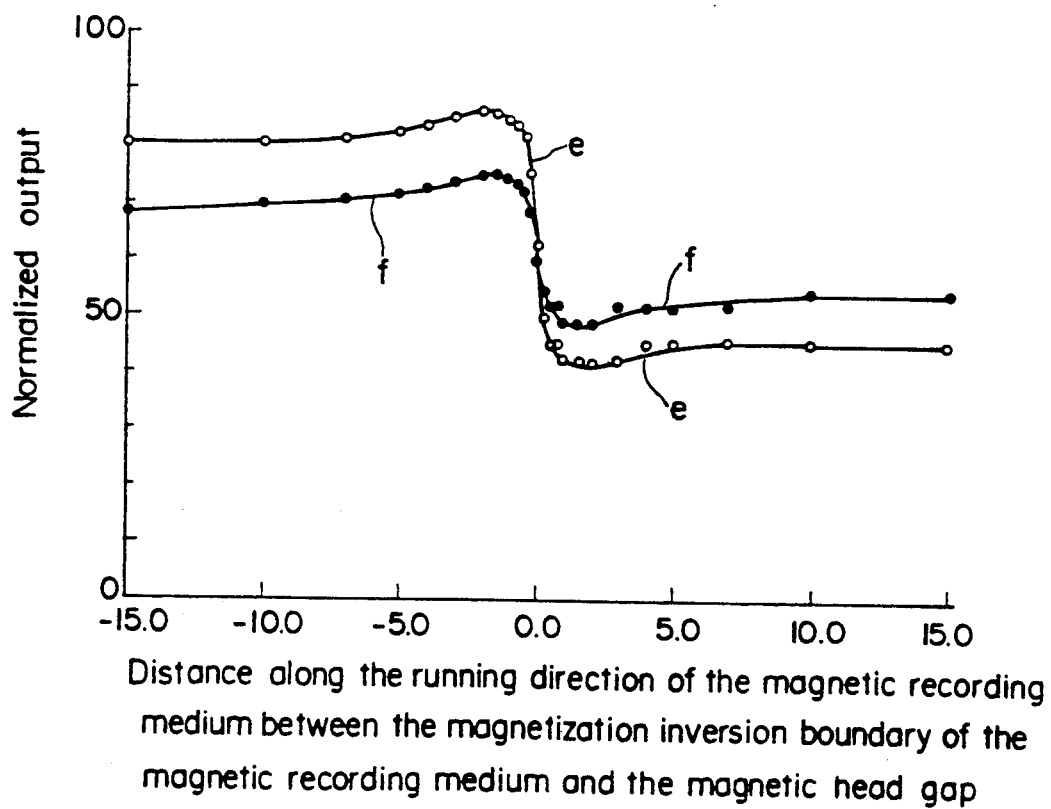
FIG. 8 is a graph showing the reproducing output characteristics of thin film magnetic heads.

FIG. 8 shows the variation of the reproducing output of the thin film magnetic head. In FIG. 8, a curve e indicates the reproducing output of the thin film magnetic head in Example 8, and a curve f indicates the reproducing output of the conventional thin film magnetic head shown in FIG. 11 for comparison. A mentioned above, since the back thin film magnetic core 7 is omitted, the peak-to-peak value of the thin film magnetic head in Example 8 is 44%, which is far greater than the peak-to-peak value of 26.2% of the conventional thin film magnetic head. Thus, it was confirmed that the thin film magnetic head is capable of operating at an improved reproducing efficiency.

Thus, many modifications of the thin film magnetic head in the first aspect of the present invention are possible.

EXAMPLE 9

Figure 1:
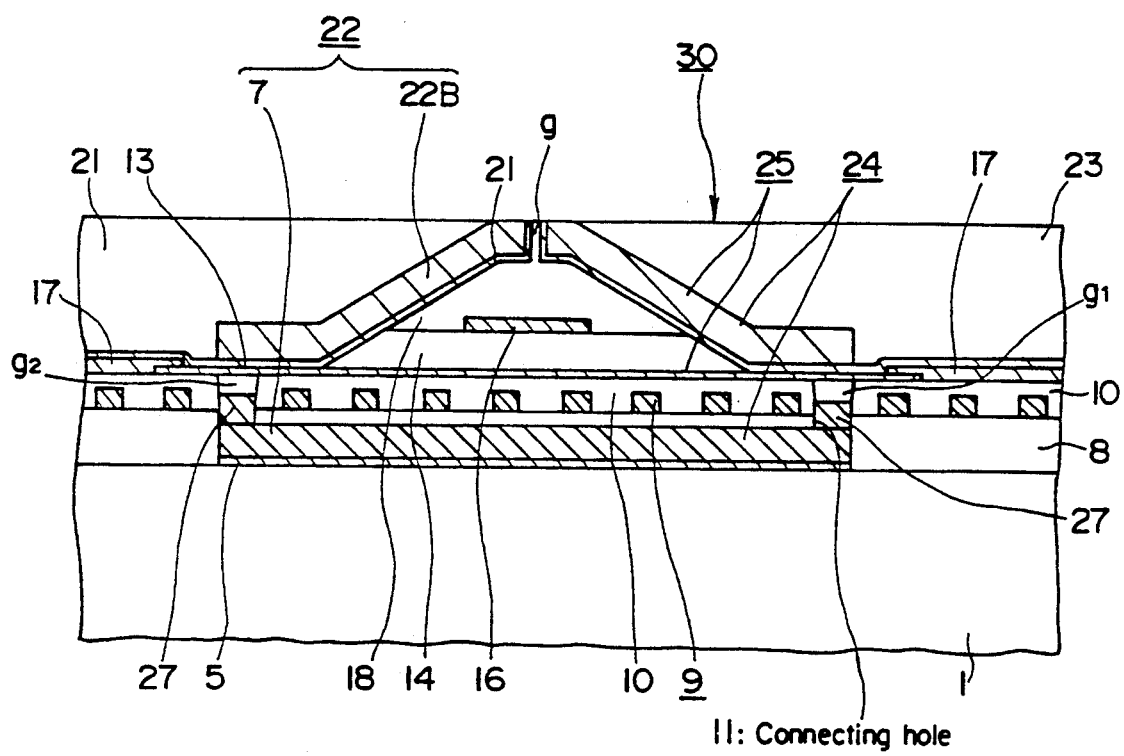
FIG. 1 is an enlarged schematic sectional view of a thin film magnetic head in a first embodiment according to the present invention.
Figure 2:
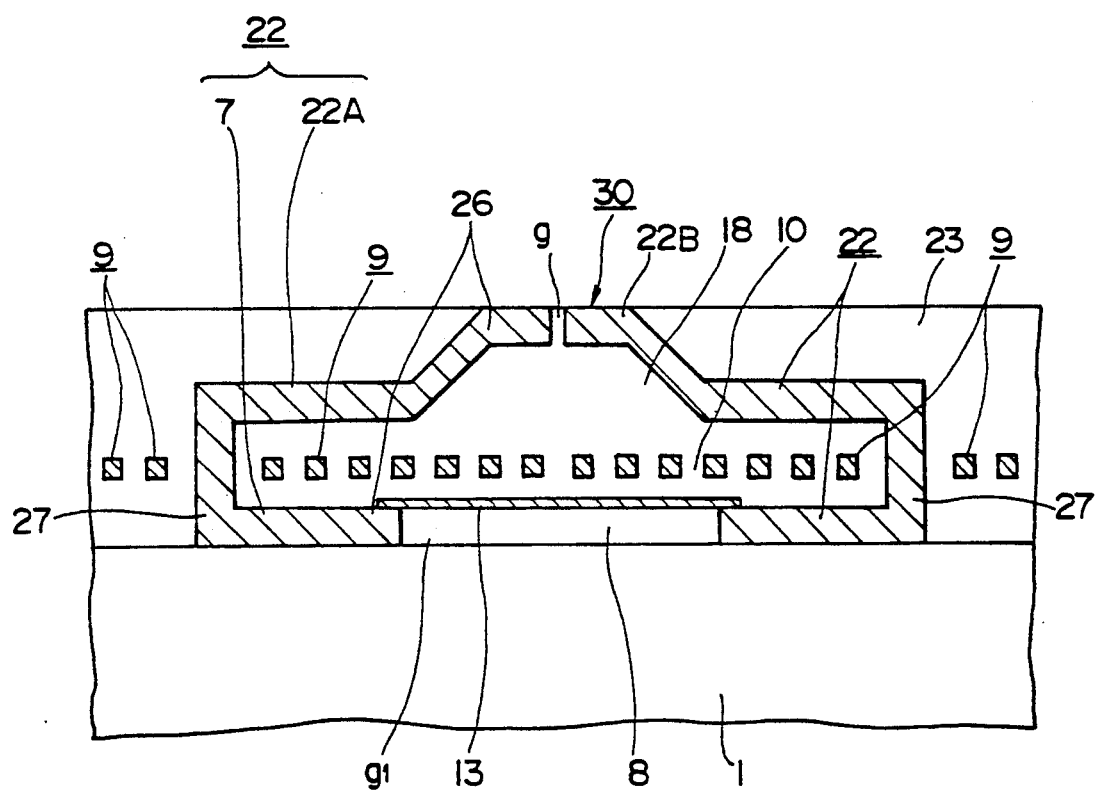
FIG. 2 is an enlarged schematic sectional view of a thin film magnetic head in a second embodiment according to the present invention.

A thin film magnetic head in Example 9 is an embodiment in accordance with the second aspect of the present invention. This thin film magnetic head has a construction as shown in FIG. 2 and comprises a front thin film core 22A provided with a magnetic head gap g, a back thin film magnetic core 7 provided with an auxiliary magnetic head gap $g_1$, and a MR element 13 disposed in the auxiliary magnetic head gap $g_1$. The front thin film magnetic core 22A, the back thin film magnetic core 7 and the MR element 13 form a closed magnetic path.

The thin film magnetic head in Example 9 is fabricated by a process similar to that described previously with reference to FIGS. 6A to 6K, except that the auxiliary magnetic head gap g is formed in the magnetic layer 7A by patterning, and the MR element 13 is formed so as to extend between the separate portions of the back thin film magnetic core 7 separated by the auxiliary magnetic head gap $g_1$ in step shown in FIG. 6B. The MR element 13 is the same as that shown in FIG. 10, employed in the thin film magnetic head in Example 1. After completing the step shown in FIG. 6B, a head coil 9, bent portions 27, a front thin film magnetic core 22A, and an insulating layer 23 forming an air bearing surface 30 are formed in the same steps as those for forming those components of Example 1 to complete the thin film magnetic head in accordance with the second aspect of the present invention.

Omission of the bias conductor layer simplifies the process of fabricating the thin film magnetic head. Since the MR element 13 is provided in the single closed magnetic path, the reproducing efficiency can be improved.

Although the invention has been described in its preferred forms with a certain degree of particularity, obviously many changes and variations are possible therein. It is therefore to be understood the present invention may be practiced otherwise than as specifically described herein without departing from the scope and spirit thereof.

What is claimed is:

1. A thin film magnetic head comprising:
   a thin film magnetic core to be disposed substantially in parallel to the surface of a magnetic recording medium, provided with a magnetic head gap;
   said thin film magnetic core forming part of a first closed magnetic path;

a head coil disposed so as to be magnetically coupled with the first closed magnetic path; and a magnetoresistance-effect element disposed so as to form a second closed magnetic path magnetically coupled with a portion of the first closed magnetic path including the magnetic head gap;

auxiliary magnetic head gaps are formed in portions of said first closed magnetic path other than the portion including the magnetic head gap.

2. A thin film magnetic head comprising:

a thin film magnetic core to be disposed substantially in parallel to the surface of a magnetic recording medium, provided with a magnetic head gap;

said thin film magnetic core forming a closed magnetic path;

an auxiliary magnetic head gap being formed in the closed magnetic path in addition to the magnetic head gap;

a magnetoresistance-effect element disposed in the auxiliary magnetic head gap and closely spaced from said magnetic head gap, a bias conductor closely spaced from said magnetoresistance-element on the other side therefrom from said head gap; and a head coil disposed so as to be magnetically coupled with the closed magnetic path.

3. A thin film magnetic head comprising:

a thin film magnetic core to be disposed substantially in parallel to the surface of a magnetic recording medium, provided with a magnetic head gap;

said thin film magnetic core forming a closed magnetic path;

an auxiliary magnetic head gap being formed in the closed magnetic path in addition to the magnetic head gap;

a magnetoresistance-effect element disposed in the auxiliary magnetic head gap and having no bias conductor associated therewith; and a head coil disposed so as to be magnetically coupled with the closed magnetic path.

4. A thin film magnetic head comprising:

a thin film magnetic core to be disposed substantially in parallel to the surface of a magnetic recording medium, provided with a magnetic head gap;

said thin film magnetic core forming a closed magnetic path;

an auxiliary magnetic head gap being formed in the closed magnetic path in addition to the magnetic head gap;

a magnetoresistance-effect element connected with said thin film magnetic core at a position closely spaced from said magnetic head gap, and a head coil disposed so as to be magnetically coupled with the closed magnetic path.

* * * * *